United States Patent
Georges et al.

(10) Patent No.: US 9,527,772 B2
(45) Date of Patent: Dec. 27, 2016

(54) PROCESS FOR PRODUCTION OF A HYDRAULIC COMPOSITION WITH ENTRAINED AIR

(75) Inventors: Sébastien Georges, Mions (FR); Emmanuel Villard, Saint-Christo-en-Jarez (FR); Alain Jacquet, Saint-Didier de Formans (FR); Laurent Barcelo, Montreal (CA); Anik Delagrave, Saint-Lambert (CA)

(73) Assignee: LAFARGE, Paris (FR)

( * ) Notice: Subject to any disclaimer, the term of this patent is extended or adjusted under 35 U.S.C. 154(b) by 642 days.

(21) Appl. No.: 13/521,519

(22) PCT Filed: Jan. 10, 2011

(86) PCT No.: PCT/FR2011/050032
§ 371 (c)(1),
(2), (4) Date: Aug. 13, 2012

(87) PCT Pub. No.: WO2011/086311
PCT Pub. Date: Jul. 21, 2011

(65) Prior Publication Data
US 2012/0304893 A1    Dec. 6, 2012

(30) Foreign Application Priority Data
Jan. 15, 2010 (FR) .................. PCT/FR2010/000032

(51) Int. Cl.
*C04B 28/02* (2006.01)
*C04B 111/10* (2006.01)

(52) U.S. Cl.
CPC ........ *C04B 28/02* (2013.01); *C04B 2111/1093* (2013.01); *Y02W 30/92* (2015.05)

(58) Field of Classification Search
CPC . C04B 20/002; G01N 2001/385; G01N 21/75; G01N 1/405
See application file for complete search history.

(56) References Cited

U.S. PATENT DOCUMENTS

| | | | | |
|---|---|---|---|---|
| 4,116,706 A | * | 9/1978 | Previte | G01N 33/383 106/724 |
| 6,706,111 B1 | * | 3/2004 | Young | 106/705 |
| 2007/0204763 A1 | * | 9/2007 | Mao | C04B 18/08 106/705 |

FOREIGN PATENT DOCUMENTS

| | | |
|---|---|---|
| DE | 103 58 372 A1 | 10/2004 |
| DE | 103 58 369 A1 | 12/2004 |

(Continued)

OTHER PUBLICATIONS

Zhang, Yinzhi; Nelson, Sid Jr.. "Development of a New Method to Replace the Foam Index Test". World of Coal Ash. 2007. Retrieved from http://infohouse.p2ric.org/ref/45/44890.pdf.*

(Continued)

*Primary Examiner* — Jun Li
*Assistant Examiner* — Karam Hijji
(74) *Attorney, Agent, or Firm* — Pillsbury Winthrop Shaw Pittman LLP (57) ABSTRACT

A treatment process for the production of a hydraulic composition with entrained air including at least one admixture and a constituent including carbonaceous materials, the process including: obtaining a representative value of the adsorption of probe molecules by the carbonaceous materials; and producing the hydraulic composition or treating the constituent with a quantity of admixture which depends on the value.

18 Claims, 3 Drawing Sheets

(56) References Cited

FOREIGN PATENT DOCUMENTS

WO     WO 2004/067471 A2     8/2004
WO     WO 2007/084794 A2     7/2007

OTHER PUBLICATIONS

Zhang, Yinzhi; Nelson Jr., Sid. "Development of a New Method to Replace the Foam Index Test". Sorbent Technologies Corp. 2007. World of Coal Ash. Retrieved from http://www.flyash.info/2007/165zhang.pdf.*

Adasaka, Wayne S.; Taubert, Donald H. "Beneficial Uses of Cement Kiln Dust". Cement Industry Technical Conference. 2008. Retrieved from http://www.concretethinker.com/content/upload/437.pdf.*

International Search Report for PCT/FR2011/050032.

BASF AG: "Pluronic RPE types", Feb. 2004, XP002602099, http://www.chemieportal.com/pl/daten/biete/2/RPE1740.pdf (retrieved on Sep. 24, 2010).

* cited by examiner

PROCESS FOR PRODUCTION OF A HYDRAULIC COMPOSITION WITH ENTRAINED AIR

CROSS-REFERENCE TO RELATED APPLICATIONS

This is the U.S. National Stage of PCT/FR2011/050032, filed Jan. 10, 2011, which in turn claims priority to PCT/FR2010/000032, filed Jan. 15, 2010, the entire contents of both applications are incorporated herein by reference in their entireties.

FIELD OF THE INVENTION

The present invention relates to a process for production of a hydraulic composition with entrained air, in particular a concrete, in which at least one constituent comprises carbonaceous materials, as well as an associated production line.

TECHNICAL BACKGROUND

In order to reduce emissions of carbon dioxide resulting from the production process of clinker, the current trend is to reduce the quantity of clinker in a concrete. One possibility consists of at least partially replacing part of the clinker by a cement addition or adding an addition of a type of fly ash to the clinker. An example of a cement addition corresponds to fly ash, which is a waste material produced by coal power stations.

Certain countries impose a reduction of emissions of heavy metals, in particular mercury, in power stations. With this aim, active carbon may be injected in the process to trap the heavy metals and may therefore be found in the waste material produced by the power plants. Active carbon may then be found in the fly ash used as a cement addition. One disadvantage is that active carbon modifies the action of certain admixtures used in concretes, in particular the air-entraining agents.

An air-entraining agent, or AEA, is an admixture which makes it possible to increase the quantity of entrained air in a concrete during the production of the concrete. The air-entraining agent is for example as defined in the NF EN 934-2 Standard, <<Admixture for concrete, mortar and slurry—Part 2: Admixtures for concrete—Definitions, specifications, conformity, marking and labelling>>. The presence of active carbon tends to reduce the action of the air-entraining agent. More generally, the presence of carbonaceous materials in the hydraulic composition, in particular active carbon or unburned carbon in fly ash, tends to reduce the efficiency of the air-entraining agent of a hydraulic composition.

One difficulty comes from the fact that the quantity of active carbon is generally very variable from one type of fly ash to another and may greatly vary for the same type of fly ash. It is therefore not possible to predict the evolution of the efficiency of an air-entraining agent when using a new batch of fly ash for the production of a concrete.

Furthermore, it is possible that a reduction of emissions of heavy metals, in particular mercury, will also be imposed on cement plants that produce clinker. It could then be envisaged that active carbon be used to trap the heavy metals and be found in the clinker produced by the cement plant or in the dusts of a cement kiln. The presence of active carbon would then tend to reduce the efficiency of an air-entraining agent present in the concrete produced using the clinker.

There therefore exists a need for a process of production making it possible to obtain the regularity of the properties of a hydraulic composition, in particular a hydraulic composition having a desired and regular content of entrained air, in the presence of at least one constituent comprising variable quantities of carbonaceous materials, in particular active carbon or unburnt carbon.

SUMMARY OF THE INVENTION

The invention relates to a treatment process for the production of a hydraulic composition with entrained air comprising at least one admixture and a constituent comprising carbonaceous materials, in particular active carbon or unburnt carbon, the process comprising:
  obtaining a representative value of the adsorption of probe molecules by the carbonaceous materials; and
  production of the hydraulic composition or the treatment of the said constituent with a quantity of admixture which depends on the said value.

The term <<hydraulic composition>> is to be understood according to the present invention as a composition with a hydraulic set and, in particular, slurries, mortars and concretes intended for all the construction markets (buildings, civil engineering, bore wells or pre-cast plants).

The term <<constituent of a hydraulic composition>>, is to be understood as a material used for the production of the hydraulic composition. It is for example fly ash, cement, cement kiln dust, a cement addition, an additive for cement, etc.

The term <<hydraulic composition with entrained air>> is to be understood according to the present invention as a hydraulic composition having a volume of voids greater than 4% of the total volume of the hydraulic composition.

The expression <<hydraulic binder>> is to be understood according to the present invention as a pulverulent material, which, mixed with water, forms a paste which sets and hardens as a result of hydration reactions and processes.

The term <<concrete>>, is to be understood as a mix of hydraulic binder, aggregates, water, optionally admixtures, and optionally mineral additions, for example high performance concrete, very high performance concrete, self-placing concrete, self-levelling concrete, self-compacting concrete, roller-compacted concrete, fibre concrete, ready-mix concrete or coloured concrete. The term <<concrete>>, is also to be understood as concretes having been submitted to a finishing operation, for example bush-hammered concrete, exposed or washed concrete or polished concrete. Pre-stressed concrete is also to be understood by this definition. The term <<concrete>> comprises mortars. In this specific case, the concrete comprises a mix of hydraulic binder, sand, water and optionally admixtures and optionally mineral additions. The term <<concrete>> according to the invention denotes without distinction fresh concrete or hardened concrete.

The term <<aggregates>> is to be understood according to the invention as gravel, coarse gravel and/or sand.

The expression <<Portland cement>>, is to be understood according to the invention as a cement of type CEM I, CEM II, CEM III, CEM IV or CEM V according to the NF EN 197-1 <<Cement>> Standard.

The term <<fly ash>> is to be understood according to the present invention as a material obtained by electrostatic or mechanical precipitation of pulverulent particles contained in the smoke of boilers fed with pulverized coal (refer to the EN 197-1 Standard, paragraph 5.2.4).

The expression <<carbonaceous materials>> or <<active carbonaceous materials>> or <<adsorbing carbonaceous materials>> is to be understood as any carbonaceous material capable of at least partially adsorbing an air-entraining agent in a hydraulic composition. In particular, it may be unburnt carbon of fly ash or active carbon.

The term <<active carbon>> or <<activated carbon>> is to be understood as a material in the form of a powder, consisting essentially of carbonaceous material with a microporous structure.

The expression <<inertant>> or <<inerting agent>> is to be understood as a compound adapted to at least partially neutralise the deleterious effects of carbonaceous materials on the hydraulic composition, in particular adapted to block the adsorption of the air-entraining agent by the carbonaceous materials. The inerting agent may also be called a sacrificial agent.

The expression <<probe molecules>> is to be understood as molecules which may be detected when they are present in solution and which may be adsorbed by the carbonaceous materials.

According to an embodiment, the admixture is an air-entraining agent. The process then consists of compensating for the presence of the carbonaceous materials in the hydraulic composition by increasing the quantity of air-entraining agent in the hydraulic composition.

According to an embodiment, the admixture is an agent adapted to inert carbonaceous materials. Examples of agents adapted to inert the carbonaceous materials are described in patent applications WO 2004/067471 and WO 2007/084794. Preferably, the use of the admixture makes it possible for the reduction of the air content of the hydraulic composition thirty minutes after mixing the hydraulic binder, the air-entraining agent and the water, to be less than 3%.

According to an embodiment, the admixture comprises at least one polymer comprising at least one chain having hydrophobic end groups and an intermediary hydrophilic group between the hydrophobic end groups.

Preferably, the hydrophobic end group comprises or consists of one or more alkyleneoxy groups carrying at least three carbon atoms. Preferably, each hydrophobic end group comprises at least one propylene oxide (propyleneoxy) or butylene oxide group (butyleneoxy), preferably a propyleneoxy group.

At least one of the hydrophobic end groups may comprise at least one amine function. Preferably, each hydrophobic end group comprises an amine function. By way of example, when the hydrophobic end group comprises one or more alkyleneoxy groups, the amine group may be carried by the alkyleneoxy group furthest from the intermediary hydrophilic group.

Preferably, the hydrophobic end group comprises at least one propylene oxide (propyleneoxy) or butylene oxide group (butyleneoxy), preferably a propyleneoxy group.

Preferably, the intermediary hydrophilic group comprises or consists of at least one alkyleneoxy group carrying 2 or less than 2 carbon atoms. Preferably, the intermediary hydrophilic group comprises at least one ethylene oxide group (ethyleneoxy).

According to an embodiment of the invention, the hydrophobic end groups comprise a succession of first monomers and the intermediary hydrophilic group comprises a succession of second monomers. According to an embodiment of the invention, the first monomer has a base of propylene oxide. Preferably, the first monomer is a propyleneoxy group. According to an embodiment of the invention, the second monomer has a base of ethylene oxide. Preferably, the second monomer is an ethyleneoxy group.

According to an embodiment of the invention, the polymer is a three-block copolymer. According to an embodiment of the invention, the polymer comprises at least one chain successively comprising a first hydrophobic block comprising a succession of at least two first monomers, a second hydrophilic block comprising a succession of at least two second monomers and a third hydrophobic block comprising at least a succession of at least two monomers, optionally identical to the first monomer, the first and third blocks being located at the ends of the chain.

According to an embodiment of the invention, the polymer is linear.

According to an embodiment, the polymer is water-soluble.

According to an embodiment of the invention, the admixture further comprises a supplementary polymer which is different to the said polymer, the said supplementary polymer being adapted to at least partially neutralise the carbonaceous materials.

According to an embodiment of the invention, the supplementary polymer comprises at least one chain having hydrophilic end groups and an intermediary hydrophobic group between the hydrophilic end groups.

According to an embodiment of the invention, the hydrophilic end groups comprise a succession of third monomers and the intermediary hydrophobic group comprises a succession of fourth monomers. According to an embodiment of the invention, the third monomer has a base of ethylene oxide. Preferably, the third monomer is an ethyleneoxy group. According to an embodiment of the invention, the fourth monomer has a base of propylene oxide. Preferably, the fourth monomer is a propyleneoxy group. According to an embodiment of the invention, the supplementary polymer is a three-block copolymer.

According to an embodiment of the invention, the supplementary polymer comprises at least one chain successively comprising a fourth hydrophilic block comprising a succession of at least two third monomers, a fifth hydrophobic block comprising a succession of at least two fourth monomers and a sixth hydrophilic block comprising at least a succession of at least two monomers which are optionally identical to the third monomer, the fourth and sixth blocks being located at the ends of the chain.

According to an embodiment of the invention, the supplementary polymer is linear.

Advantageously, the intermediary hydrophobic group of the supplementary polymer corresponds to more than 50% by mass percentage relative to the mass of the supplementary polymer, preferably more than 60%, advantageously more than 70%.

Preferably, the molecular mass of the supplementary polymer is from 7000 g/mol to 9000 g/mol, preferably from 7500 g/mol to 8500 g/mol, more preferably approximately 8000 g/mol.

According to an embodiment, the supplementary polymer is water soluble.

According to an embodiment, the constituent comprises fly ash. In this case, the fly ash may correspond to waste material from a power plant and the carbonaceous materials may correspond to unburnt carbon of the fly ash or to active carbon used to trap heavy metals in the waste materials of the power plant.

According to an embodiment, the probe molecules may be a dye. The dye may be any molecule which is soluble in a solution, adapted to provide colour to the solution and be adsorbable by the carbonaceous materials. By way of example, the dye is included in the group comprising methylene blue, acridine, safranine, thioflavine, bromophenol blue, alizarin red S, methyl blue, Eriochrome black T, malachite green, phenol red, methyl violet, toluoylene red (or neutral red), lycopene and tartrazine. Preferably, the dye is methylene blue.

The production site of the constituent comprising the carbonaceous materials is generally different from the production site of the hydraulic composition.

According to an embodiment, the treatment of the constituent with the admixture takes place on the production site of the constituent and the treated constituent is then transported to the production site of the hydraulic composition. The withdrawal of at least one sample of the constituent and the measurement of the value which is representative of the adsorption of the probe molecules by the carbonaceous materials may then be carried out on the production site of the constituent.

According to another embodiment of the invention, the withdrawal of at least one sample of the constituent and the measurement of the value which is representative of the adsorption of the probe molecules by the carbonaceous materials is carried on the production site of the constituent. However, the constituent is not treated with the admixture on the production site of the constituent. The constituent not treated with the admixture is then transported to the production site of the hydraulic composition. The step of the process according to the invention of obtaining the value which is representative of the adsorption of the probe molecules by the carbonaceous materials then corresponds to providing, on the production site of the hydraulic composition, the value measured on the production site of the constituent. The admixture is then preferably added during the production of the hydraulic composition.

According to another embodiment, all the steps of the process according to the invention may be carried out on the production site of the hydraulic composition. By way of example, the constituent not treated with the admixture is transported to the production site of the hydraulic composition and the step of the process according to the invention of obtaining the value which is representative of the adsorption of the probe molecules by the carbonaceous materials may correspond to carrying out, on the production site of the hydraulic composition, the withdrawal of at least one sample of the constituent and to measure a value which is representative of the adsorption of the probe molecules by the carbonaceous materials. The admixture is then preferably added during the production of the hydraulic composition.

Three embodiments of the production process of a hydraulic composition according to the invention are now described.

First Embodiment of the Process for Production of a Hydraulic Composition According to the Invention According to a first embodiment of the invention, the process further comprises:

Measurement of a first supplementary value which is representative of the adsorption of the probe molecules for each first portion from at least two first portions of a supplementary constituent with different quantities of supplementary carbonaceous materials;

Production, for each first portion, of a supplementary hydraulic composition with the supplementary constituent of the first portion;

determination, for each first portion, of the quantity of admixture to be added to the supplementary hydraulic composition to reach a specific property;

Measurement of a second supplementary value representative of the adsorption of the probe molecules for each second portion from at least two second portions of the said constituent having different quantities of the said carbonaceous materials;

determination of a correction coefficient from the first and second supplementary values;

determination, for the said value, of the estimated quantity of admixture to be added to the hydraulic composition comprising the said supplementary constituent; and determination of the quantity of admixture to be added to the hydraulic composition comprising the said constituent from the estimated quantity of admixture and from the correction coefficient.

By way of example, in the case where the constituent of the hydraulic composition comprising the carbonaceous materials comprises fly ash, the carbonaceous materials comprise active carbon and the probe molecules correspond to a dye, the first embodiment of the process comprises the use of reference fly ash and reference active carbon. It is possible that the reference fly ash may not have the same origin as the fly ash used for the production of the hydraulic composition. Likewise, it is possible that the reference active carbon may not have the same origin as the active carbon associated with the fly ash used for the production of the hydraulic composition. A reference hydraulic composition is produced with reference fly ash using the same formulation as the hydraulic composition to be produced.

By way of example, for the reference hydraulic composition, the quantity of air-entraining agent or inerting agent to be supplied to obtain a given air content is determined for different quantities of active carbon. A measurement of the dye value, in particular methylene blue, is also carried out on the fly ash. Therefore, the curve of the quantity of air-entraining agent or inerting agent to be provided as a function of the measured dye value is obtained for the reference hydraulic composition. The inventors having shown that it was approximately a straight line, the measurements for only two different values of quantities of active carbon can be used. The curve of the dye value, measured as a function of the carbon content contained in the fly ash of the reference hydraulic composition, was further obtained. The inventors have shown that it was approximately a straight line from which the slope $K_{ref}$ is determined.

For the fly ash used for the hydraulic composition to be produced, the carbon content and the corresponding dye value is measured beforehand for two portions of fly ash comprising different quantities of active carbon. The $K_{test}$ slope of the curve of the dye value as a function of the carbon content in the fly ash of the hydraulic composition to be produced is then determined.

For the hydraulic composition to be produced, the dye value $BV_{test}$ is measured on the sampled fly ash. Then, the quantity of air-entraining agent or inerting agent $Q_{Addref}$ to be provided for the measured dye value $BV_{test}$, for the reference hydraulic composition, is determined from the curve. The quantity of air-entraining agent or inerting agent $Q_{Addtest}$ to be provided for the hydraulic composition to be produced with the sampled fly ash is given by the following relation:

$$Q_{AEAtest} = Q_{AEAref} * (K_{test}/K_{ref})$$

Second Embodiment of the Process for Production of a Hydraulic Composition According to the Invention According to a second embodiment of the invention, the process further comprises:

measurement of a supplementary value which is representative of the adsorption of the probe molecules for each portion from at least two portions of the said constituent with different quantities of the said carbonaceous materials;

production, for each portion from the at least two portions, of a hydraulic composition with the constituent of the portion;

determination, for each portion from the at least two portions, of the actual quantity of admixture to be added to the hydraulic composition comprising the constituent of the portion to reach a specific property; and production of the hydraulic composition with the said constituent and with a quantity of admixture which depends on the said value, the said supplementary values and the actual quantities of admixture.

By way of example, in the case where the constituent of the hydraulic composition comprising the carbonaceous materials comprises fly ash, the carbonaceous materials comprise active carbon and the probe molecules correspond to a dye, the second example of the process comprises the use of fly ash which has the same origin as the fly ash used for the hydraulic composition to be produced but which has different contents of active carbon. By way of example, the second embodiment comprises measuring beforehand the carbon content for two portions of fly ash comprising different quantities of active carbon and the corresponding dye value. For each portion the quantity of air-entraining agent or inerting agent to be provided to obtain a hydraulic composition with a given air content is determined. Two pairs of values are thus obtained (quantity of air-entraining agent or inerting agent, dye value) noted as $(Q_{Add1}, BV_1)$ and $(Q_{Add2}, BV_2)$.

A measurement of the dye value $BV_{test}$ is carried out for the sample of the hydraulic composition to be tested. The quantity of air-entraining agent or inerting agent $Q_{Addtest}$ to be provided for the production of the hydraulic composition with the sampled fly ash is then given by the following relation:

$$Q_{AEAtest} = \left(\frac{Q_{Add2} - Q_{Add1}}{BV_2 - BV_1}\right) BV_{test} + \left(\frac{Q_{Add1} BV_2 - Q_{Add2} BV_1}{BV_2 - BV_1}\right)$$

Third Embodiment of the Process for Production of a Hydraulic Composition According to the Invention According to a third embodiment of the invention, the process further comprises:

Measurement of a supplementary value which is representative of the adsorption of the probe molecules for each portion from at least two portions of a supplementary constituent with different quantities of the supplementary carbonaceous materials;

Production, for each portion, from the at least two portions, of a supplementary hydraulic composition with the supplementary constituent of the portion;

Determination, for each portion from the at least two portions, of the quantity of admixture to be added to the supplementary hydraulic composition to reach a specific property; and Production of the hydraulic composition with the said constituent and with a quantity of admixture which depends on the said value, the said supplementary values and on the actual quantities of admixture.

By way of example, in the case where the constituent of the hydraulic composition comprising the carbonaceous materials comprises fly ash, the carbonaceous materials comprise active carbon and the probe molecules correspond to a dye, the third embodiment of the process comprises the use of reference fly ash and reference active carbon. It is possible that the reference fly ash may not have the same origin as the fly ash used for the production of the hydraulic composition. Likewise, it is possible that the reference active carbon may not have the same origin as the active carbon associated with the fly ash used for the production of the hydraulic composition. A reference hydraulic composition is produced with the reference fly ash using the same formulation as the hydraulic composition to be produced.

By way of example, for the reference hydraulic composition, the quantity of air-entraining agent or inerting agent to be provided to obtain a given air content is determined for different quantities of active carbon. A measurement of the dye value is also carried out on the fly ash. Therefore, the curve of the quantity of air-entraining agent or inerting agent to be provided as a function of the measured dye value is obtained for the reference hydraulic composition. The inventors, having shown that it was approximately a straight line, the measurements for only two different values of quantities of active carbon can be used. The dye curve, measured as a function of the carbon content contained in the fly ash of the reference hydraulic composition, was further obtained.

For the hydraulic composition to be produced, the dye value $BV_{test}$ is measured on the sampled fly ash. Then, the quantity of air-entraining agent or inerting agent $Q_{Addref}$ to be provided for the measured dye value $BV_{test}$ for the reference hydraulic composition is determined. The quantity of air-entraining agent or inerting agent $Q_{Addtest}$ for the hydraulic composition to be produced with the sampled fly ash is considered to be equal to $Q_{Addref}$.

The invention also relates to a treatment process for the production of a hydraulic composition with entrained air comprising a constituent comprising cement or cement kiln dust and further comprising carbonaceous materials, characterised in that it comprises the addition to the constituent of an admixture adapted to at least partially inert the carbonaceous materials.

According to an embodiment, the hydraulic composition with entrained air does not comprise fly ash.

According to an embodiment, the addition of the admixture to the constituent is carried out before the production of the hydraulic composition.

Treatment Line

The present invention also relates to a treatment line for the production of a hydraulic composition with entrained air comprising at least one admixture and a constituent comprising carbonaceous materials, the treatment line comprising:

means of providing a representative value of the adsorption of probe molecules by the carbonaceous materials; and means of producing the hydraulic composition or the treatment of the said constituent with a quantity of admixture which depends on the said value More detailed embodiments of treatment lines are described in the case where the probe molecules correspond to methylene blue. However, it is clear that these embodiments of the treatment line according to the invention may be adapted to other probe molecules.

According to an embodiment, the treatment line comprises:

means to withdraw at least one sample of the constituent;

means to measure the methylene blue value of the sample of the constituent; and means to produce the hydraulic composition or treatment of the said constituent with a quantity of admixture which depends on the methylene blue value.

According to an embodiment, the measurement of the methylene blue value is carried out according to the NF EN 933-9 Standard.

According to an embodiment, the measurement of the said value comprises an automated measurement of the said value in an aqueous solution and/or an organic solution and/or in a mix of an aqueous solution and an organic solution. Preferably, the measurement of the methylene blue value comprises an automated measurement of the methylene blue value in an aqueous solution and/or an organic solution and/or in a mix of an aqueous solution and an organic solution, for example a mix of water and di-ethylene glycol.

According to a particular embodiment, the withdrawal of the sample and measurement of the methylene blue value are carried out at least once a week, preferably at least once a day, in a more particularly preferred manner at least once an hour, ideally approximately every ten minutes. According to another embodiment, the withdrawal of the sample and measurement of the methylene blue value are carried out on a case-by-case basis, for example upon request by an operator using an interface.

According to a particular embodiment, the admixture or inerting agent is an agent adapted to inert carbonaceous materials, the process according to the invention further comprising mixing the constituent comprising the carbonaceous materials or another constituent of the hydraulic composition with the inerting agent. The inerting agent may be mixed in solid form (granule, powder) or in liquid form. Preferably, when the inerting agent is mixed with fly ash, it is suitably sprayed or mixed in liquid form to obtain a homogenous mix. Preferably, when the inerting agent is added during the production of the hydraulic composition, it is in liquid form.

According to a particular embodiment, the mixing of the constituent with an inerting agent is carried out upstream and/or downstream of the withdrawal of the sample of the constituent.

According to a particular embodiment, the quantity of inerting agent during the mixing is adjusted according to the measurement of the methylene blue value and so that the constituent from the mixing has a methylene blue value within the pre-determined range.

According to a particular embodiment, the above-mentioned process comprises the homogenisation and/or screening and/or division and/or drying of the sample of the constituent, before measurement of the methylene blue value.

According to a particular embodiment, the measurement of the methylene blue value comprises:

mixing the sample of the constituent with a solution to form a dispersion;

injecting one single dose of methylene blue into the dispersion;

separating the dispersion into particles and a liquid fraction; and determining the quantity of excess methylene blue in the liquid fraction not having reacted with the sample of the constituent.

According to a particular embodiment, the said separation is carried out by filtering and/or by sedimentation by addition of a flocculating agent.

According to a particular embodiment, the determination of the quantity of methylene blue not having reacted is carried out by a measurement of the absorbance and/or transmittance.

According to a particular embodiment, the said absorbance and/or transmittance measurement is carried out in a spectrophotometric cell or using a phototrode.

According to a particular embodiment, the said absorbance and/or transmittance measurement is carried out at a wave length between 380 nm and 780 nm, preferably between 640 and 680 nm and preferably 660 nm.

According to a particular embodiment, the injected dosage of methylene blue is between 0.1 and approximately 20 g of dry methylene blue per kilogram of the constituent, preferably between approximately 5 and approximately 10 g of dry methylene blue per kilogram of the constituent.

According to a particular embodiment, the treatment line of the above-mentioned constituent comprises means of mixing the constituent with an inerting agent, the said mixing means being located upstream and/or downstream of the means of withdrawing the sample of the constituent.

According to a particular embodiment, the treatment line of the above-mentioned constituent comprises a control unit between the automated measurement means of the methylene blue value and the means of mixing the constituent with an inerting agent.

According to a particular embodiment, the means of withdrawing the sample of the constituent comprises a rotary traversing sampler or a pivoting traversing sampler or a drawer sampler or a continuous screw sampler.

According to a particular embodiment, the treatment line of the above-mentioned constituent comprises means for homogenisation and/or screening and/or dividing and/or drying of the sample of the constituent upstream of the measurement means of the methylene blue value.

According to a particular embodiment, the means for measurement of the methylene blue value comprise:

a vessel to mix the sample of the constituent with a solution and with the methylene blue;

automated means for dosage and injection of methylene blue into the mixing vessel.

According to a particular embodiment, the means for measurement of the methylene blue value comprise filtering means and/or injection means of a flocculating agent.

According to a particular embodiment, the mixing vessel is provided with a phototrode.

According to a particular embodiment, the treatment line of the above-mentioned constituent comprises:
  a spectrophotometric measurement cell;
  circulation means from the mixing vessel towards the measurement cell and circulation means from the measurement cell towards the mixing vessel.

The invention further relates to a process for measurement of the methylene blue value of a sample of the constituent, comprising:
  mixing the sample of the constituent with a solution to form a dispersion;
  injecting one single dose of methylene blue in the dispersion;
  separating the dispersion into particles and a liquid fraction; and
  determining the quantity of excess methylene blue in the liquid fraction not having reacted with the sample of the constituent.

This measurement process is specially designed to be used within the scope of the treatment process of the above-mentioned constituent.

According to a particular embodiment, the solution is an aqueous solution or a mix of water and di-ethylene glycol.

The present invention makes it possible to overcome the disadvantages of the state of the art. In particular it provides a process making it possible to improve the quality control of the constituent.

This is accomplished by the development of a process for production of the constituent comprising an integrated and automated on-line measurement of the constituent's methylene blue value.

According to certain particular embodiments, the invention also has the advantageous characteristics listed below.

It is possible to easily and economically control the quality of the constituent on the production site of the hydraulic composition, or on the production site of the constituents of the hydraulic compositions comprising the carbonaceous materials, mainly without human interventions. The increase of the measurement frequencies makes it possible to closely monitor the evolution of the quality of the constituent during the production.

The embodiment according to which an over-dosage of the methylene blue is carried out makes it possible to considerably save time compared to the <<drop by drop>> addition method of the methylene blue.

The measurement of the methylene blue on the treatment line of the constituent makes it possible to set up a feedback cycle in order to produce the constituent with a pre-determined quality, despite possible variations of the quality of the constituent.

The invention also provides a process for production of the constituent of a suitable quality for use in a hydraulic composition, which is inerted on the production line itself by adding an active agent specifically acting on the carbonaceous materials. The adjustment of the quantities of inerting agent, according to the measurement of the methylene blue value further makes it possible to make savings of the inerting products, which are expensive.

DESCRIPTION OF THE EMBODIMENTS OF THE INVENTION

The invention is now described in more detail and in a non-restrictive manner in the following description. Examples of embodiments of treatment lines according to the invention are now described in the case where the constituent of the hydraulic composition comprising the carbonaceous materials comprises fly ash. However, it is clear that these examples of embodiments of treatment lines according to the invention may be adapted in the case where the constituent comprising the carbonaceous materials comprises cement and/or cement kiln dust and/or an addition for cement.

Treatment Line of Fly Ash

Figure 1:
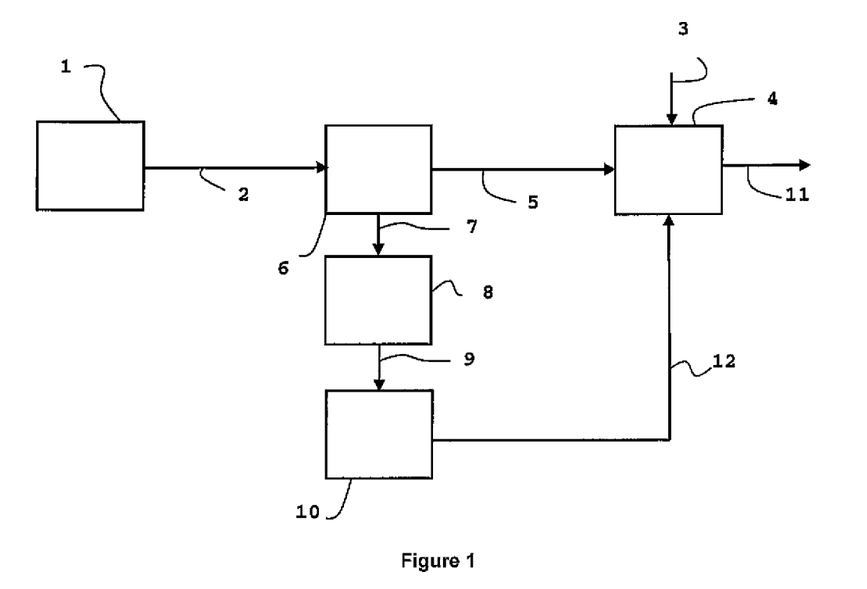
FIG. 1 represents in a diagram form an example of a treatment line according to the invention.

FIG. 1 represents a first example of a treatment line according to the invention. The treatment line comprises supply means 1 of a base composition comprising fly ash. In the present embodiment of the invention, the base composition may correspond to fly ash by itself, optionally containing carbonaceous materials, in particular active carbon or unburnt carbon. However, by way of a variant, the base composition may correspond to any constituent of the hydraulic composition comprising the carbonaceous materials, for example cement, cement kiln dust, mineral additions, additions for cement, etc.

Fly ash conveying means 2 (being able to comprise conveyor belts, silos, hoppers, chutes, etc) transport the fly ash to the periodic and automated fly ash sample withdrawal means 6. These withdrawal means 6 are advantageously provided to withdraw a typical amount of fly ash of at least 50 g, preferably approximately 100 to approximately 200 g. In order to maintain representativity of the sample it may be necessary that the withdrawal be greater than 50 g. It may reach several kilograms. For this purpose it is possible to used a sampler, for example those commercialised by Penox, Tema or Forratechnic. The rotary, linear or pivoting traversing samplers and the conduit samplers make it possible to ensure good representativity of the samples of the withdrawn fly ash compared to all the fly ash on the treatment line; they make it possible to limit the problems of segregation related to the heterogeneity of the supply. However, other samplers, for example the drawer samplers, the endless screw samplers, the flap samplers and the belt samplers may be preferred due to their lower price and simplicity.

At the outlet of the withdrawal means 6 fly ash sample conveying means 7 are provided. These conveying means 7 feed the fly ash sample treatment means 8. These treatment means 8 may comprise, depending on the case, of means for homogenisation and/or screening and/or dividing and/or drying. The homogenisation means comprise a mixer. The screening means comprise for example a sieve. The dividing means comprise for example quartering systems. These may be simple quartering systems by gravity or automatic, preferably rotary. The drying means comprise, for example, heating means. All the withdrawal means 6 and the treatment means 8 may be integrated in the same apparatus, in which case the conveying means 7 are strictly reduced to a minimum, or even absent.

At the outlet of the treatment means 8 treated sample conveying means 9 are provided which feed the automatic methylene blue value measurement means 10.

The treatment line further comprises, downstream from the withdrawal means 6, fly ash conveying means 5 towards the fly ash mixing means 4 with an inerting agent in liquid or solid form. The mixing means 4 are on the other hand fed by an inerting agent supply line 3. Any means making it possible to obtain a homogenous mix resulting in an inerted product may be envisaged, for example, the mixing means 4 for the fly ash with an inerting agent may consist of a mixer in which the inerting agent is introduced. The latter will preferably be sprayed onto the fly ash during the mixing. Any type of mixer may be used. The spray nozzles should be selected according to the desired ranges of flow of the inerting agent and the geometry of the installation. The inerting agent may also be directly added into the fly ash to be treated by a simple flow if the flow of matter is sufficiently well channelled. The treatment is preferably carried out continuously but may also be carried out in batches.

Conveying means 11 for the inerted fly ash are provided at the outlet of the mixing means 4 and transport the fly ash, which may, for example feed a fly ash conditioning system.

A regulatory means 12 is provided, which makes it possible to adjust the operating parameters of the fly ash mixing means 4 with the inerting agent according to the result of the obtained measurement of the automatic methylene blue value measurement means 10.

Figure 2:
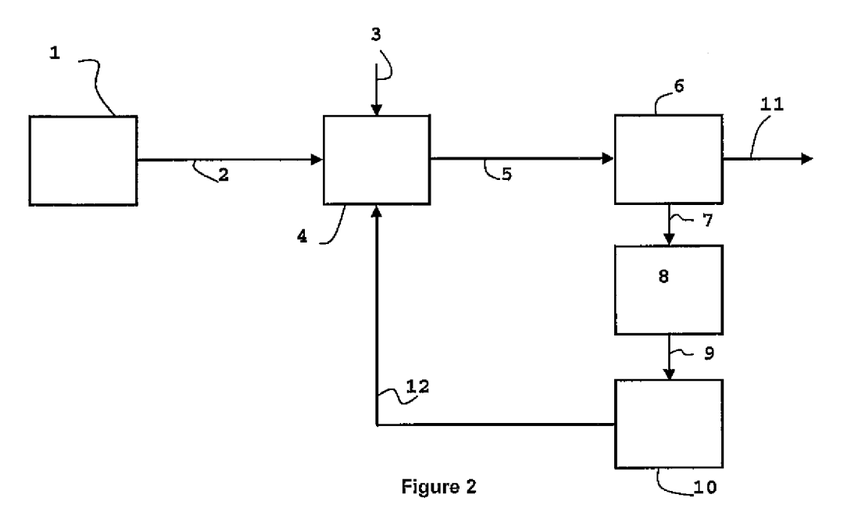
FIG. 2 represents in a diagram form another example of a treatment line according to the invention.

FIG. 2 represents another embodiment of a treatment line in which the mixing means 4 are arranged upstream from the withdrawal means 6.

According to another non-represented embodiment, first mixing means are provided for the fly ash with an inerting agent upstream from the withdrawal means and second fly ash mixing means with an inerting agent downstream from the withdrawal means.

According to another variant of the treatment line, it is possible to replace the mixing means 4 for the fly ash with an inerting agent by mixing means for the fly ash with an air-entraining agent. In this case, the air-entraining agent is preferably in liquid form.

Process for Production of a Composition Comprising Fly Ash

In the process of production according to the invention of a composition comprising fly ash, for example fly ash alone is provided by the supply means 1 and transported by the conveying means 2. The given fly ash is constituted by a powder of average granulometric size between 0.1 and 200 microns and preferably less than 45 microns.

At a certain location on the treatment line (before and/or after the inerting process), a sample of fly ash is withdrawn automatically and in a periodic or occasional manner.

The term <<periodic withdrawal>> is to be understood that successive samples of fly ash are repeatedly withdrawn. This may be a withdrawal at regular time intervals, for example once a week or once a day or once an hour, even once every ten minutes or even more frequently. The duration of the withdrawal may also be variable, from a few seconds to several minutes. It may also be a withdrawal at irregular intervals. For example, it is possible to reduce the frequency of the withdrawals if the fly ash has relatively homogeneous and constant characteristics or, on the contrary, increase the frequency of the withdrawals if the quality of the fly ash has substantial variations By way of a variant, the withdrawal may be carried out occasionally, for example upon request from an operator by means of a suitable interface.

An automated measurement of the methylene blue value is then carried out on the withdrawn sample of fly ash. The sample of fly ash may optionally be treated before carrying out this measurement.

It may then be appropriate to screen (sieve) the sample before the measurement. It may indeed be desired to carry out the measurement on only a fraction of the fly ash. In this case, the sample of fly ash is sieved and only the passing portion is kept.

Furthermore, it may be suitable to divide the sample of fly ash before the measurement. The measurement should indeed be carried out on a pre-determined mass of fly ash, for example between 20 and approximately 50 g, more particularly approximately 30 g. It is possible to provide that the withdrawal means and optionally the screening means be adapted to provide a sample with a desired mass. Otherwise, the sample of fly ash is divided in order to obtain the desired mass.

The automated measurement of the methylene blue value is then carried out, as described below. The mixing of the fly ash and the admixture is carried out from the methylene blue value obtained. To carry this out the fly ash production process comprises a regulatory system (and optionally a feedback loop). This regulatory system can operate in an automated manner.

The term <<inerting process>> is to be understood as the at least partial neutralisation of the carbonaceous materials. The inerting process takes place by mixing the fly ash with an inerting agent capable of reacting specifically with the carbonaceous materials. Suitable inerting agents are in particular those described in patent applications WO2004/067471 and WO2007/084794.

The inerting process of the carbonaceous materials present in the fly ash may be carried out by a simple mixing of the fly ash with the inerting agent. The dosage of injected inerting agent may vary between 0 and 4% by mass of dry inerting agent in the fly ash and preferably from 0 to 20 grams of inerting agent per kilogram of fly ash. This dosage is preferably adapted according to the result of the automatic measurement of the methylene blue value, in order to provide inerted fly ash with a methylene blue value less than a set value.

The treatment of the fly ash by the inerting process may be carried out downstream of the withdrawal of the sample. In this case, the inerting process corrects the quality of the produced fly ash according to the quality of the initially supplied raw fly ash. The quantity of inerting agent which must be added to obtain a given methylene blue value should also be adapted according to the nature of the fly ash and to the nature of the carbonaceous materials present in the fly ash.

In the case of fly ash containing a lot of carbonaceous materials, it is possible to provide a first treatment by the inerting process right after the supply of the fly ash, then a withdrawal of a sample and a measurement of the methylene blue value in order to control whether the treated fly ash has a satisfactory quality and then, and only if it appears to be necessary, a second treatment by the inerting process to finish improving the quality of the fly ash.

It is also possible to provide that the fly ash is only submitted to a single treatment by the inerting process right after the supply and upstream of the withdrawal of the sample. This configuration has the double advantage of (I) providing a measurement of the actual methylene blue value of the finally produced and commercialised fly ash, and (ii) making it possible, despite everything, to adjust the treatment (in particular adjust the dosage of the inerting agent) of future extracted fly ash, according to the result of this measurement. This configuration is particularly well adapted to fly ash which presents sufficiently slow drifts in terms of quality to be able to be corrected within a certain lapse of time.

The fly ash produced by the process according to the invention may be used to produce concrete.

Specific Device and Measurement Process of the Methylene Blue Value

Figure 3:
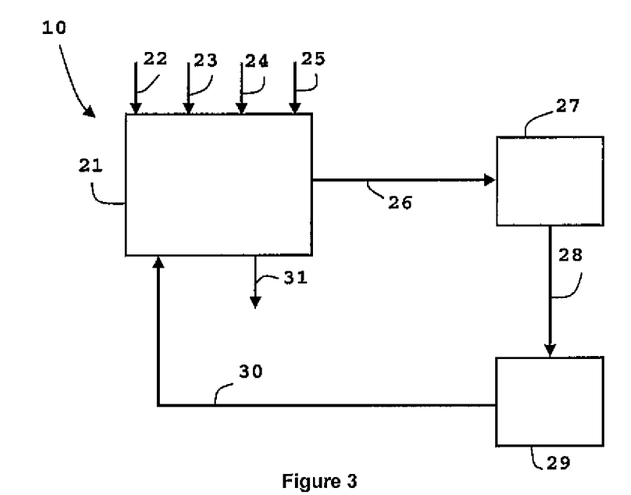
FIG. 3 represents in a diagram form an example of an automated measurement device of the methylene blue value, which is integrated into the treatment line according to the invention.

With reference to FIG. 3, an example of automated measurement means 10 of the methylene blue value comprises a mixing vessel 21 provided with stirring means, fed by an automated dosage and injection line 22 of the sample of fly ash, optionally containing carbonaceous materials, an automated dosage and injection line 23 of water (or aqueous solution) and an automated dosage and injection line 24 of methylene blue. The mixing vessel 21 may also comprise an automated dosage and injection line 25 of flocculating agent. A first extraction line 26 connects the mixing vessel 21 to the filtering means 27. A second extraction line 28 connects the filtering means 27 to a spectrophotometric cell 29. A third extraction line 30 connects the spectrophotometric cell 29 to the mixing vessel 21. The mixing vessel 21 is advantageously provided with draining means 31.

Alternatively, it is possible to omit the lines 26, 28, 30 and the spectrophotometric cell 29 and replace it all with a phototrode directly placed in the mixing vessel 21 (or in a side vessel connecting with the mixing vessel 21).

The measurement procedure takes place as follows: the sample of fly ash, optionally treated beforehand (that is to say, sieved and/or divided and/or inerted) is introduced by the line 22 into the mixing vessel 21. It is mixed by stirring with the water or an aqueous solution from line 23, to provide a dispersion (or suspension). A dosage of methylene blue is then injected by the line 24, and the dispersion is again mixed. The blue is then preferably added in over-dosage. The injected methylene blue then reacts, in totality or partially, with the carbonaceous materials in the fly ash. It is then necessary to measure whether excess methylene blue remains which did not react, and if so, what quantity. A photometric measurement is carried out for this purpose by absorbance and/or by transmittance. Advantageously, a dilution of the dispersion is carried out, for example for a factor greater than 100, for example greater than 200, for example, approximately 250.

A first means of carrying out this photometric measurement consists of having the dispersion circulate until reaching the spectrophotometric cell 29 where the absorption and/or transmission of a light beam through the cell is measured. It is then possible to circulate the dispersion again returning to the mixing vessel 21.

A second means of carrying out this photometric measurement consists of using a phototrode. This entails having carried out a calibration beforehand of the solution of methylene blue at various concentrations.

In the two cases, it is generally necessary to carry out the measurement proper on a relatively limpid liquid phase, which implies a separation step of the dispersion into a liquid phase and into particles. This separation may, for example be carried out by sedimentation or by filtration, through filtering means 27, which may consist of a filter or several filters in a series (for example with first a coarse filtering, then a fine filtering). It is also possible, as a complement or replacement of the filtering means 27, to provide centrifugation means. The mixing vessel 21 itself, may optionally be directly centrifuged. A third method, which may be used as a complement or replacement of the two previous methods, is flocculation. The injection of a flocculating agent through the line 25 makes it possible for the finer particles of the dispersion to settle in a few minutes and generally in a few seconds, the bigger particles settling rapidly under the effect of their own weight. The flocculating agents are selected from the usually used products in the industry of aggregates to flocculate the sand fines in the loaded waters coming from the washing of the materials. Generally, non-ionic or cationic flocculants are preferred because they present fewer risks of reacting with the cationic molecule of methylene blue. By way of example of a flocculating agent used here, the Praestol 2300D (DEGUSSA), the FA920 (SNF) and the AN905 (SNF) products may be mentioned. In any case the filters or the flocculating agent are selected so that they are efficient with the type of fly ash and the given carbonaceous materials and that they do not inter-react with the methylene blue.

The dosage of the dry flocculating agent is generally between 0.1 and 100 ppm and preferably between 1 and 20 ppm.

The injection of methylene blue may be carried out several times, by repeating the operations below and with a photometric measurement after each injection until determining the value of methylene blue. But it is also possible to be satisfied with one single photometric measurement, as long as an over-dosage of methylene blue is carried out, that is to say a single dosage of excess methylene blue is injected relative to the quantity necessary to react with the carbonaceous materials of the fly ash, and then to directly measure the quantity of methylene blue not having reacted to deduce the quantity of methylene blue having reacted, and hence the methylene blue value (equal to the quantity in grams of adsorbed methylene blue per kilogram of fly ash). For example, the single dosage of methylene blue may be between 0.1 and 20 grams of methylene blue per kilogram of fly ash and preferably between 5 and 10 grams per kilogram of fly ash and may be selected more precisely according to the range of quality which is expected for the given fly ash. For example, a quantity of 1 gram of methylene blue for 30 grams of fly ash may be suitable if the methylene blue value of the fly ash is always less than 20 grams per kilogram of fly ash.

Given that the photometric measurement is then carried out on a dispersion which appears to be saturated in methylene blue, and taking into account the sensitivity of the measurement apparatus, it may be useful or necessary to do several measurements and in particular:

- to dilute the dispersion before the measurement in order for the concentration of methylene blue in the dispersion to remain within the order of a few ppm maximum (typically less than 10 ppm for a measurement with a spectrophotometer or less than 5 ppm with a phototrode); and/or
- to carry out absorbance calibrations rather than transmittance calibrations because transmittance is proportional to the measured light intensity whilst absorbance varies with the logarithm of the measured light intensity (typically to make it possible to broaden the range of measurable concentrations from 0-4 ppm to 0-8 ppm); and/or either to work with a light beam with a wave length between 640 and 680 nm, preferably 660 nm (which corresponds to the maximum absorption value of the methylene blue), or rather to work with a shifted wave length compared to the absorption peak, for example at a wave length of approximately 590 nm, in order to reduce the sensitivity of the measurement.

The measurement method by over-dosages makes it possible to obtain considerable savings in time compared to the <<drop by drop>> method (progressive additions of given volumes of the blue solution). The process for measurement of the methylene blue value of a sample of fly ash described herein is specially adapted to be used within the scope of the process for production of fly ash according to the invention and to be used on the treatment line of the invention.

At the end of the automated measurement, the system should be cleaned with a view to receiving the following sample. In particular, the mixing vessel 21 is drained by the line 31, and optionally washed with water using the line 23.

EXAMPLES

Embodiments of the present invention are illustrated by the following non-restrictive examples. The products and material used in the examples are available from the following suppliers:

| Product or material | Supplier |
| --- | --- |
| Portland cement | Lafarge-Le Havre |
| AEA-MICRO-AIR ™ 104 | BASF |
| Pluronic ™ RPE 1720 inerting agent | BASF |
| Fly ash | Will County production site |
|  | Fisk production site |

The Will County and Fisk fly ash is of class C.

Several types of active carbon were used. Table 1 below gives the name, supplier and BET specific surface for each active carbon.

TABLE 1

| Active carbons | | |
| --- | --- | --- |
| Name | Supplier | BET Surface (m$^2$/g) |
| Fluepac CF plus | Calgon Carbon | 300 |
| C-PAC | Albemarle | 460 |
| GLZ-50 | Norit | 515 |
| HPAC | Albemarle | 600 |
| AC-LNA | Lafarge North America | 480 |
| GL 50 | Norit | 720 |

Measurement Method of the BET Surface of Active Carbon

This method consists of injecting a volume of nitrogen gas, up to a controlled pressure, in an enclosure maintained at constant temperature and containing a sample of active carbon powder. The temperature of the medium is close to the condensation temperature of the nitrogen which will be adsorbed in liquid form on the surface of the powder. The adsorbed volume, as a function of the saturation level of nitrogen is recorded during the measurement. From this curve, called the adsorption/desorption isotherm. the BET specific surface (expressed in m$^2$/g) is calculated by different mathematical models.

This measurement requires preparation of the sample under vacuum in order to remove all the adsorbed molecules from the pores. In the case of the data give in Table 1, the samples of active carbon were prepared under vacuum at 200° C. for 4.5 hours.

Mortar Formulation

Mortar formulations (1) and (2) used to carry out the tests are described in the following Tables 2 and 3:

TABLE 2

| Mortar Formulation (1) | |
| --- | --- |
| Component | Proportion (in grams) |
| Le Havre Portland Cement | 0.7 * 808.8-0.7 * X |
| 0/4 Sand | 2700 |
| Fly Ash | 0.3 * 808.8-0.3 * X |
| Active carbon | X (varies between 0.1 and 2% of the mass of binder) |
| Mixing water | 505 |
| AEA | Optimum concentration for approximately 10% of air in ppm relative to the binder |

TABLE 3

| Mortar Formulation (2) | |
| --- | --- |
| Component | Proportion (in grams) |
| Le Havre Portland Cement | 808.8 |
| 0/4 Sand | 2700 |
| Fly Ash | X (varies between 0.1 and 2% of the mass of cement) |
| Active carbon | 0 or 50 ppm |
| Mixing water | 505 |

The mixing water/binder ratio is 0.496. The Portland cement from Lafarge is a CEM I 52,5 PMES cement. The hydraulic binder, or binder, corresponds to the ensemble comprising the Portland cement and the fly ash and the active carbon.

Preparation Method of the Mortar

The mortar according to formulation (1) is carried out using a mixer of the Perrier type. The entire operation is carried out at 20° C. The preparation method comprises the following steps:

Put the sands in the mixer vessel;
At T=0 second: begin mixing at low speed (140 rpm) and simultaneously add the wetting water in 30 seconds, then continue to mix at low speed (140 rpm) until 60 seconds;
At T=1 minute: stop the mixing and let rest for 4 minutes;
At T=5 minutes: add the hydraulic binder;
At T=6 minutes: mix for 1 minute at low speed (140 rpm);
At T=7 minutes: add the mixing water in 30 seconds (whilst continuing to mix at low speed (140 rpm)); and
At T=7 minutes and 30 seconds: mix for 1 minute at high speed (300 rpm).

Measurement Method of the Air Content of a Mortar

This is a standardized test described in the NF EN 1015-7 Standard. The measurement method comprises the following steps:

Fill an aerometer having a capacity of 0.75 L with mortar;
Close the aerometer;
Compress the air contained in the mortar using a piston until reaching a specific pressure;
Determine the volume; and
Deduce the volume of air contained in the mortar.

Measurement of the Methylene Blue Value

The measurement protocol of the methylene blue value for the described tests is analogous to the one described in the NF-EN 933 Standard and is the following:
1) Weigh 500+/−5 g of de-mineralised water in a beaker.
2) Stir the de-mineralised water at 600 rpm+/−10% for 5 minutes.
3) Add 30+/−0.1 g of fly ash to be tested into the beaker.
4) Stir the suspension at 400 rpm+/−10%.
5) Add a solution of methylene blue at 10 g/L using a precision dosing device.
6) After one second, withdraw a drop of the mix and deposit it on filter paper <<RS quali. lent>> of the brand name Jean-Pierre D.
7) If no ring forms around the deposit, the process continues to step 6).
8) The protocol is finished when a ring of a diameter greater than 1 mm forms after 5 seconds.

By calling $M_{MB}$ the mass of added methylene bleu and $M_{FA}$ the mass of fly ash, the blue value, or BV, is determined by the following relation:

$$BV = 10 * (M_{MB}/M_{FA})$$

Example 1

Establishment of the First Measurement Method of the Quantity of Air-Entraining Agent to be Added to a Hydraulic Composition to be Tested The first example of the previously described process for production of a hydraulic composition according to the invention was carried out. Fly ash not containing active carbon, to which active carbon was added, was used to simulate fly ash polluted by active carbon. This makes it possible to easily modify the quantity of active carbon associated with the fly ash The reference fly ash is Will County fly ash not intrinsically containing active carbon. The reference active carbon is GLZ50. The reference hydraulic composition corresponds to the mortar according to formulation (1) in which the fly ash is Will County fly ash. The hydraulic binder corresponds to the ensemble comprising the Portland cement and the fly ash. The optimum concentration of air-entraining agent is considered to be the concentration which results in a 10% air content, Tests were carried out by modifying the quantity of active carbons added to the reference hydraulic composition.

The development of the optimum concentration of air-entraining agent was determined as a function of the quantity of active carbon added to the fly ash and the development of the methylene blue value of the fly ash was determined as a function of the quantity of added active carbon. The optimum concentrations of AEA (in parts per million) in the reference mortar and the methylene blue value obtained as a function of the quantity of added GLZ50 active carbon (in mass percentage relative to the weight of the hydraulic binder) are given in the following Table 4:

TABLE 4

| | Optimum concentration of AEA | | | |
|---|---|---|---|---|
| | Concentration of GLZ50 (%) | | | |
| | 0 | 0.1 | 0.5 | 1 |
| Optimum concentration of AEA (ppm) | 100 | 200 | 500 | 1100 |
| Methylene blue value | 0.2 | 0.5 | 1.2 | 2.7 |

Figure 4:
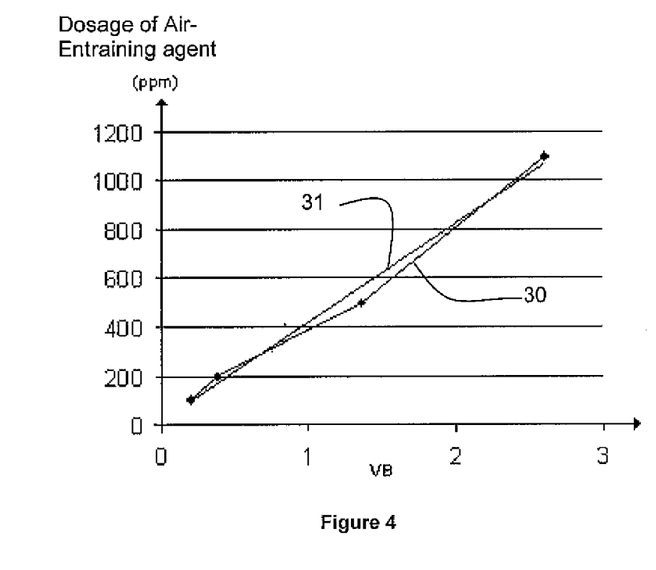
FIG. 4 represents the evolution of the dosage of the air-entraining agent as a function of the methylene blue value.

FIG. 4 represents the curve 30 of the optimum concentration of AEA (in parts per million) in the reference mortar as a function of methylene blue value. A suitable approximation of the curve 30 corresponds to the straight line 31.

By way of a hydraulic composition to be produced, the mortar according to formulation (1) was used in which the fly ash is Will County fly ash. Measurements of the blue value, BV, were carried out for the fly ash comprising different active carbons at different concentrations (expressed in mass percentage of active carbon relative to the weight of fly ash).

Figure 5:
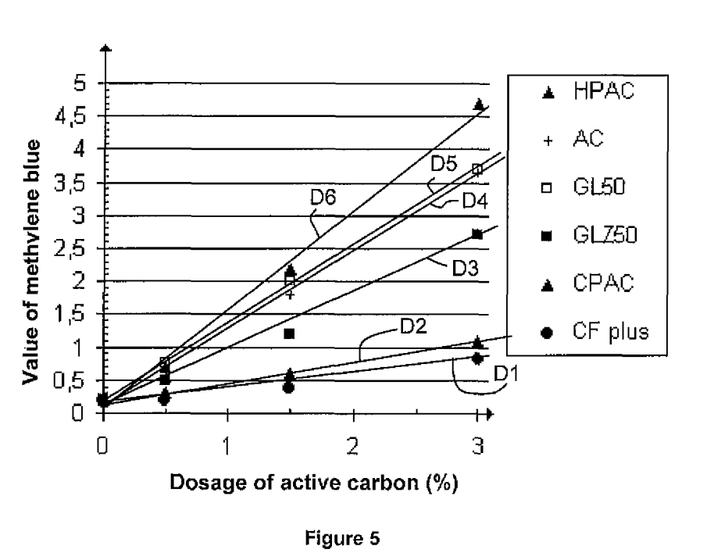
FIG. 5 represents the curves of the methylene blue values as a function of concentrations of different active carbons in a fly ash.

The results are grouped together in Table 5 below and are illustrated in FIG. 5.

TABLE 5

| Measurement results of the methylene blue value | | | | |
|---|---|---|---|---|
| | Methylene blue value (g/kg of fly ash) | | | |
| | Concentration of active carbon (%) | | | |
| Active carbon | 0 | 0.5 | 1.5 | 3 |
| HPAC | 0.2 | 0.7 | 2.2 | 4.7 |
| AC-LNA | 0.2 | 0.65 | 1.8 | 3.65 |
| GL50 | 0.2 | 0.75 | 2 | 3.7 |
| GLZ50 | 0.2 | 0.5 | 1.2 | 2.7 |
| CPAC | 0.2 | 0.3 | 0.6 | 1.1 |
| CF Plus | 0.2 | 0.2 | 0.4 | 0.8 |

For each type of active carbon added to the Will County fly ash, the blue value BV increases in a substantially linear manner (straight lines D1 to D6) with the content of active carbon. The slopes of the straight lines D1 to D6 are given in Table 6 herein below:

TABLE 6

| Slope | |
|---|---|
| Active carbon | Slope |
| HPAC | 1.47 |
| AC-LNA | 1.25 |
| GL50 | 1.17 |
| GLZ50 | 0.83 |
| CPAC | 0.38 |
| CF Plus | 0.27 |

The optimum concentrations in AEA for these hydraulic compositions to be produced are obtained by multiplying the optimum concentrations of Table 4 by the $K_{test}/K_{GLZ50}$ ratio of the slopes between the given active carbon and the reference active carbon, in the present example the GLZ50 active carbon.

The estimated optimum concentrations of AEA (expressed in ppm) are given in the following Table 7:

TABLE 7

| Optimum concentration of AEA | | | | |
|---|---|---|---|---|
| | | Optimum concentration of AEA (ppm) | | |
| Active carbon | $K_{test}/K_{ref}$ ratio | Concentration of active carbon: 0.1% | Concentration of active carbon: 0.5% | Concentration of active carbon: 1% |
| GLZ50 | 1 | 200 | 500 | 1100 |
| GL50 | 1.5 | 300 | 751 | 1651 |
| HPAC | 1.85 | 369 | 923 | 2031 |

TABLE 7-continued

Optimum concentration of AEA

| | | Optimum concentration of AEA (ppm) | | |
|---|---|---|---|---|
| Active carbon | $K_{test}/K_{ref}$ ratio | Concentration of active carbon: 0.1% | Concentration of active carbon: 0.5% | Concentration of active carbon: 1% |
| CPAC | 0.39 | 78 | 195 | 429 |
| CF+ | 0.27 | 54 | 134 | 295 |
| AC-LNA | 1.44 | 288 | 719 | 1583 |

The air contents (expressed in percentage by volume) actually measured at 5 and 10 minutes with the estimated optimum concentrations of AEA are given in the following Table 8:

TABLE 8

Actual air contents

| | Active carbon | | | | | | | | | |
|---|---|---|---|---|---|---|---|---|---|---|
| | HPAC | | CPAC | | GL50 | | AC-LNA | | CF+ | |
| | Concentration of active carbon: (%) | | | | | | | | | |
| | 0.5 | 1 | 0.5 | 1 | 0.5 | 1 | 0.5 | 1 | 0.5 | 1 |
| Concentration of AEA (ppm) | 920 | 2030 | 195 | 430 | 750 | 1650 | 720 | 1580 | 135 | 295 |
| Air content measured (%) at 5 minutes | 11 | 10.2 | 9.2 | 10.2 | 10.9 | 7 | 10.1 | 7.1 | 7.6 | 9.4 |
| Air content measured (%) at 10 minutes | 12 | 10.4 | 9.4 | 10.4 | 10.8 | 6.4 | 9 | 9 | 7.9 | 9.4 |

Table 8 shows a good correlation between the estimated values of the optimum concentrations of AEA and the measured values.

Example 2

Determination of the Quantity of Inerting Agent from the Methylene Blue Value for a Mortar with Fly Ash The third example of the previously described process for production of a hydraulic composition according to the invention was carried out. In the present example, the inerting agent used is commercialised under the brand name of Pluronic™ RPE 1720 by BASF. The Pluronic™ RPE 1720 inerting agent is a three-block polymer of the PO/EO/PO type (poly propylene oxide/poly ethylene oxide/poly propylene oxide) comprising a 20% content of ethylene oxide and 2150 g/mol molecular weight. The reference fly ash is Will County fly ash. The reference active carbon is GLZ50. The reference hydraulic composition corresponds to the mortar according to formulation (1) and comprises 100 ppm of air-entraining agent. The optimum concentration of inerting agent is considered to be the concentration that results in a 10% air content. Tests were carried out by modifying the quantity of active carbon added to the reference hydraulic composition.

The development of the concentration of the inerting agent was determined as a function of the quantity of active carbon added to the fly ash and the development of the methylene blue value of the fly ash was determined as a function of the quantity of added active carbon. The optimum concentrations of inerting agent (in parts per million) in the reference mortar and the methylene blue value obtained as a function of the concentration of GLZ50 active carbon (in mass percentage relative to the weight of the hydraulic binder) are given in the following Table 9

TABLE 9

Optimum concentration of AEA

| | Concentration of GLZ50 (%) | | |
|---|---|---|---|
| | 0 | 0.5 | 1 |
| Optimum concentration of AEA (ppm) | 100 | 500 | 1000 |
| Methylene blue value | 0.2 | 1.2 | 2.7 |

Figure 6:
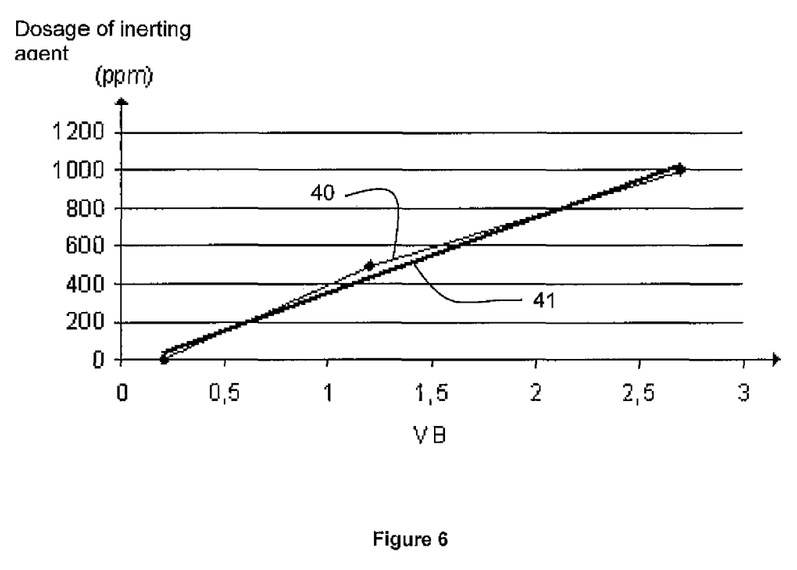
FIG. 6 represents the evolution of the dosage of the air-entraining agent as a function of the methylene blue value.

FIG. 6 represents the curve 40 of the optimum concentration of inerting agent (in parts per million) in the reference mortar as a function of the value of methylene blue. A suitable approximation of the curve 40 corresponds to the straight line 41.

As in the first test, by way of a hydraulic composition to be produced, the mortar according to formulation (1) was used in which the fly ash is Will County fly ash and the active carbon is CPAC with a 1% concentration by weight relative to the weight of the hydraulic binder. The measured methylene blue value is equal to 1.1.

The quantity of inerting agent to be added for the reference hydraulic composition is 500 ppm. The estimated quantity of inerting agent $Q_{Itest}$ for the sample of the hydraulic composition to be tested is 500 ppm.

A mortar according to formulation (1) was produced with Will County fly ash and the active carbon, CPAC, with a concentration of 1%, with a quantity of air-entraining agent of 100 ppm and a quantity of inerting agent of 500 ppm. The air content measured at 10 minutes is equal to 13% and the air content measured at 30 minutes is equal to 11.5%.

The present invention therefore provides a good estimate of the quantity of inerting agent to be added.

As in the second test, by way of a hydraulic composition to be produced, the mortar according to formulation (1) was used in which the fly ash is Fisk fly ash containing an unknown quantity of active carbon. The measured methylene blue value is equal to 1.8.

For the reference hydraulic composition, the quantity of inerting agent is 700 ppm. The quantity of inerting agent $Q_{Itest}$ estimated for the sample of the hydraulic composition to be tested is 700 ppm.

A mortar according to formulation (1) was produced with Fisk fly ash with a quantity of air-entraining agent of 100 ppm and a quantity of inerting agent of 700 ppm. The air content measured at 10 minutes is equal to 11% and the air content measured at 30 minutes is equal to 9%

The present invention therefore provides a good estimate of the quantity of inerting agent to be added.

Example 3

Determination of the Quantity of Inerting Agent for a Mortar without Fly Ash

A mortar according to formulation (2) was produced without active carbon and with 50 ppm of AEA. The initial and final air contents were measured.

A mortar according to formulation (2) was produced without active carbon and without AEA. The initial and final air contents were measured.

A mortar according to formulation (2) was produced with 50 ppm of AEA and with 0.5% of GLZ50 active carbon. The initial and final air contents were measured.

A mortar according to formulation (2) was produced with 50 ppm of AEA, with 0.5% of GLZ50 active carbon and 500 ppm of the Pluronic™ RPE 1720 inerting agent. The initial and final air contents were measured.

The results are grouped together in Table 10 below.

TABLE 10

Mortar without fly ash

| | Initial air content (%) | Final air content (%) |
|---|---|---|
| Mortar without active carbon, with AEA, without inerting agent | 13 | 14.2 |
| Mortar without active carbon, without AEA, without inerting agent | 5.2 | 5.6 |
| Mortar with 0.5% GLZ50, with AEA, without inerting agent | 2.1 | 2.1 |
| Mortar with 0.5% GLZ50, with AEA, with Pluronic ™ RPE 1720 (500 ppm) | 15.5 | 14.5 |

The mortar without active carbon and without AEA contains approximately 5.5% of naturally occluded air. The use of 50 ppm of AEA by mass of cement makes it possible to obtain approximately 14% of entrained air after 30 minutes. The pollution by 0.5% of GLZ50 by mass of cement reduces the air content to 2%. The addition of 500 ppm of Pluronic™ RPE 1720 by mass of cement increases the air content to 14.5% at 30 minutes. The Pluronic™ RPE 1720 inerting agent therefore makes it possible to neutralise the active carbon on a mortar polluted by active carbon, by increasing the air content to the level of the air content of a mortar not-polluted by active carbon and by ensuring the stability of the air content at 30 minutes.

The invention claimed is:

1. A treatment process for the production of a hydraulic composition with entrained air comprising an inerting agent and a constituent comprising carbonaceous materials, the process comprising:
   obtaining a representative value of an adsorption of probe molecules by the carbonaceous materials; and
   producing the hydraulic constituent or treating said constituent with a quantity of inerting agent which depends on said value, wherein the inerting agent comprises at least one polymer comprising at least one chain having hydrophobic end groups and an intermediary hydrophilic group between the hydrophobic end groups,
   wherein said process further comprises
      measuring a first supplementary value which is representative of the adsorption of the probe molecules for each first portion from at least two first portions of a supplementary reference constituent with different quantities of supplementary reference carbonaceous materials;
      producing, for said each first portion, a supplementary reference hydraulic composition with the supplementary reference constituent of the first portion, said supplementary reference hydraulic composition obtained for said each first portion being separate from the hydraulic composition to be produced;
      determining, for said each first portion, a quantity of inerting agent to be added to the supplementary reference hydraulic composition to reach a specific property;
      measuring a second supplementary value which is representative of the adsorption of the probe molecules for each second portion from at least two second portions of said constituent having different quantities of said carbonaceous materials, said constituent to be used to produce the hydraulic composition;
      determining a correction coefficient from the first and second supplementary values;
      determining, for said obtained representative value, an estimated quantity of inerting agent to be added to the hydraulic composition comprising the supplementary reference constituent; and
      determining the quantity of inerting agent to be added to the hydraulic composition comprising the constituent from the estimated quantity of inerting agent and the correction coefficient.

2. A treatment process for the production of a hydraulic composition with entrained air comprising an inerting agent and a constituent comprising carbonaceous materials, the process comprising:
   obtaining a representative value of an adsorption of probe molecules by the carbonaceous materials; and
   producing the hydraulic composition or treating said constituent with a quantity of inerting agent which depends on said value, wherein the inerting agent comprises at least one polymer comprising at least one chain having hydrophobic end groups and an intermediary hydrophilic group between the hydrophobic end groups,
   wherein said process further comprises
      measuring a supplementary value which is representative of the adsorption of the probe molecules for each portion from at least two portions of said constituent with different quantities of said carbonaceous materials, said constituent to be used to produce the hydraulic composition;
      producing, for said each portion, from the at least two portions, the hydraulic composition with the constituent of the portion;
      determining, for said each portion from the at least two portions, the actual quantity of inerting agent to be added to the hydraulic composition comprising the constituent of the portion to reach a specific property; and
      producing the hydraulic composition with the constituent and with a quantity of inerting agent which depends on said obtained representative value, said supplementary values and on actual quantities of inerting agent.

3. A treatment process for the production of a hydraulic composition with entrained air comprising an inerting agent and a constituent comprising carbonaceous materials, the process comprising:

obtaining a representative value of an adsorption of probe molecules by the carbonaceous materials; and producing the hydraulic composition or treating said constituent with a quantity of inerting agent which depends on said value, wherein the inerting agent comprises at least one polymer comprising at least one chain having hydrophobic end groups and an intermediary hydrophilic group between the hydrophobic end groups, wherein said process further comprises measuring a supplementary value which is representative of the adsorption of the probe molecules for each portion from at least two portions of a supplementary reference constituent with different quantities of supplementary reference carbonaceous materials;

producing, for said each portion, from the at least two portions, a supplementary reference hydraulic composition with the supplementary reference constituent of the portion;

determining, for said each portion from the at least two portions, the quantity of inerting agent to be added to the supplementary reference hydraulic composition to reach a specific property, said supplementary reference hydraulic composition obtained for said each portion being separate from the hydraulic composition to be produced; and producing the hydraulic composition with the constituent and with a quantity of inerting agent which depends on said obtained representative value, said supplementary reference values and on the actual quantities of inerting agent.

4. The process according to claim 1, wherein the constituent comprises fly ash.

5. The process according to claim 1, wherein the constituent comprises cement.

6. The process according to claim 1, wherein the constituent comprises cement kiln dust.

7. The process according to claim 1, wherein the probe molecules correspond to methylene blue.

8. The process according to claim 1, wherein the property is the air content of the hydraulic composition to be produced.

9. The process according to claim 1, wherein the measurement of said value comprises an automated measurement of the said value in an aqueous solution and/or an organic solution and/or a mixture of an aqueous solution and an organic solution.

10. The process according to claim 1, wherein the quantity of inerting agent is selected so that a reduction of air content of the hydraulic composition to be produced thirty minutes after mixing a hydraulic binder, an air-entraining agent and water to produce the hydraulic composition is less than 3%.

11. The process according to claim 2, wherein the constituent comprises fly ash.

12. The process according to claim 2, wherein the constituent comprises cement.

13. The process according to claim 2, wherein the constituent comprises cement kiln dust.

14. The process according to claim 2, wherein the probe molecules correspond to methylene blue.

15. The process according to claim 3, wherein the constituent comprises fly ash.

16. The process according to claim 3, wherein the constituent comprises cement.

17. The process according to claim 3, wherein the constituent comprises cement kiln dust.

18. The process according to claim 3, wherein the probe molecules correspond to methylene blue.

* * * * *